United States Patent [19]
Imamura et al.

[11] Patent Number: 5,383,034
[45] Date of Patent: Jan. 17, 1995

[54] IMAGE SENSOR WITH IMPROVED MOUNT FOR TRANSPARENT COVER

[75] Inventors: Masaya Imamura; Kensuke Sawase; Seiji Koshikawa, all of Kyoto, Japan

[73] Assignee: Rohm Co., Ltd., Kyoto, Japan

[21] Appl. No.: 945,212

[22] Filed: Sep. 15, 1992

[30] Foreign Application Priority Data

Sep. 30, 1991 [JP] Japan .................... 3-250037

[51] Int. Cl.[6] .............................. H04N 1/024
[52] U.S. Cl. .................. 358/474; 358/294; 358/30; 250/208.1; 348/659
[58] Field of Search ............. 358/474, 484, 256, 285, 358/213.13, 294, 213.11, 30, 483; 360/135, 133, 121, 129; 369/288, 287, 280; 350/418–419; 428/65; 250/208.1, 578, 293, 239, 227.20; 357/30.74, 30 D, 30 H, 30 Q

[56] References Cited

U.S. PATENT DOCUMENTS

| | | | |
|---|---|---|---|
| Re. 33,187 | 3/1990 | Alexander et al. | 428/65 |
| 4,623,570 | 11/1986 | Alexander et al. | 428/65 |
| 4,631,609 | 12/1986 | Erickson et al. | 360/135 |
| 4,675,534 | 6/1987 | Sekimura et al. | 358/293 X |
| 4,689,652 | 8/1987 | Shimada et al. | 357/30 |
| 4,729,805 | 3/1988 | Alexander et al. | 156/160 |
| 4,835,647 | 5/1989 | Chernega et al. | 360/135 |
| 4,839,730 | 6/1989 | Shirakoshi et al. | 358/294 |
| 4,963,209 | 10/1990 | Chernega et al. | 156/160 |
| 4,967,299 | 10/1990 | Katoh et al. | 360/121 |
| 4,999,484 | 3/1991 | Kaneko | 358/30 |
| 5,004,905 | 4/1991 | Yoshinouchi et al. | 250/208.1 |
| 5,038,027 | 8/1991 | Ioka | 250/208.1 |
| 5,138,494 | 8/1992 | Kurtin | 359/666 |
| 5,142,137 | 8/1992 | Kushino et al. | 250/208.1 |
| 5,194,725 | 3/1993 | Sawase et al. | 250/208.1 |
| 5,262,814 | 11/1993 | Nishio et al. | 354/288 |

*Primary Examiner*—Paul Ip
*Attorney, Agent, or Firm*—Wolf, Greenfield & Sacks

[57] ABSTRACT

An image sensor has a frame including a reading window formed therein at the top of the frame. The reading window is closed by a glass covering which is adhered to the frame through an adhesive. First and second grooves are provided in the frame to extend along the reading window. After the adhesive has been charged into the first groove, the glass covering is placed and pressed against the frame top so that the glass covering will be adhered to the frame top through the adhesive. At this time, any excess adhesive may be received and held by the second groove.

9 Claims, 5 Drawing Sheets

IMAGE SENSOR WITH IMPROVED MOUNT FOR TRANSPARENT COVER

BACKGROUND OF THE INVENTION

1. Field of the Invention

The present invention relates to an image sensor usable in facsimile machines, optical character readers and others.

2. Description of the Related Art

One example of the conventional image sensor is shown in FIG. 1 which is a cross-sectional view of the primary parts of the image sensor, taken along a plane perpendicular to the scan direction. The image sensor comprises a frame 30, a transparent covering (glass covering) 31 mounted on the frame 30 at the open top thereof, a base plate 33 mounted within the frame 30, a light emitting section 32 mounted on the base plate 33, another base plate 35 mounted on the frame 30 at the open bottom thereof, and a light receiving section 34 mounted on the base plate 35. The base plate 33 also supports a resilient member 37 which includes a spring-like element formed therein at the leftward end as viewed in FIG. 1. The resilient member 37 fixedly urges an optical system (rod lens array) 36 against the inner mounting wall 30a of the frame 30. In the conventional image sensor, the glass covering 31 is generally adhered to the top end face 30b of the frame 30 through any adhesive. In such a case, any excess adhesive may flow onto the outer and/or inner walls of the frame 30 to damage the property of the rod lens array 36 and/or to contaminate the frame 30. In order to overcome such problems, a proposal has been made that the top end face 30b of the frame 30 is provided with a groove 39, as shown in FIG. 2. The groove 39 is filled with an adhesive. However, such an arrangement could not completely prevent some excess adhesive from flowing onto the outer and/or inner walls of the frame 30.

SUMMARY OF THE INVENTION

It is therefore an object of the present invention to provide an image sensor in which an adhesive used to adhere the glass covering to the frame can be prevented from flowing onto the outer and/or inner walls of the frame.

To this end, the present invention provides an image sensor for reading an image on an object by irradiating light onto the object, the image sensor comprising a frame; a transparent covering mounted on the frame to close a reading window formed in the top of the frame, the transparent covering being adapted to contact the object; a light emitting section mounted within the frame for irradiating light onto the object through the transparent covering; an optical system for condensing the light reflected by the object; a light receiving section for receiving the light from the optical system; a first groove formed in the frame along one side of the reading window; and a second groove formed in the frame adjacent and parallel to the first groove, the second groove being adapted to receive and hold part of an adhesive when the transparent covering is adhered to the frame by the use of the adhesive.

In such an arrangement, any excessive adhesive may be received by the second groove when the transparent covering is to be adhered to the frame by the adhesive. The adhesive will not flow onto the inner wall of the frame.

More particularly, the first and second grooves are formed in the frame along one side of the reading window which extends in a direction perpendicular to the direction of feed of the object to be read.

A third groove may be formed in the frame top at the opposite side of the reading window to the one side thereof along which the first and second grooves are formed. The third groove enables the transparent covering to adhere to the frame top at the opposite side.

The one side of the reading window along which the first and second grooves are formed is positioned backward as viewed in the direction of movement of the object to be read. Therefore, the transparent covering can be more reliably fixed relative to the frame top in a direction in which the transparent covering is subjected to a force from the moving object.

The image sensor of the present invention may be preferably used in facsimile machines and the like.

DETAILED DESCRIPTION OF THE PREFERRED EMBODIMENTS

Figure 3:
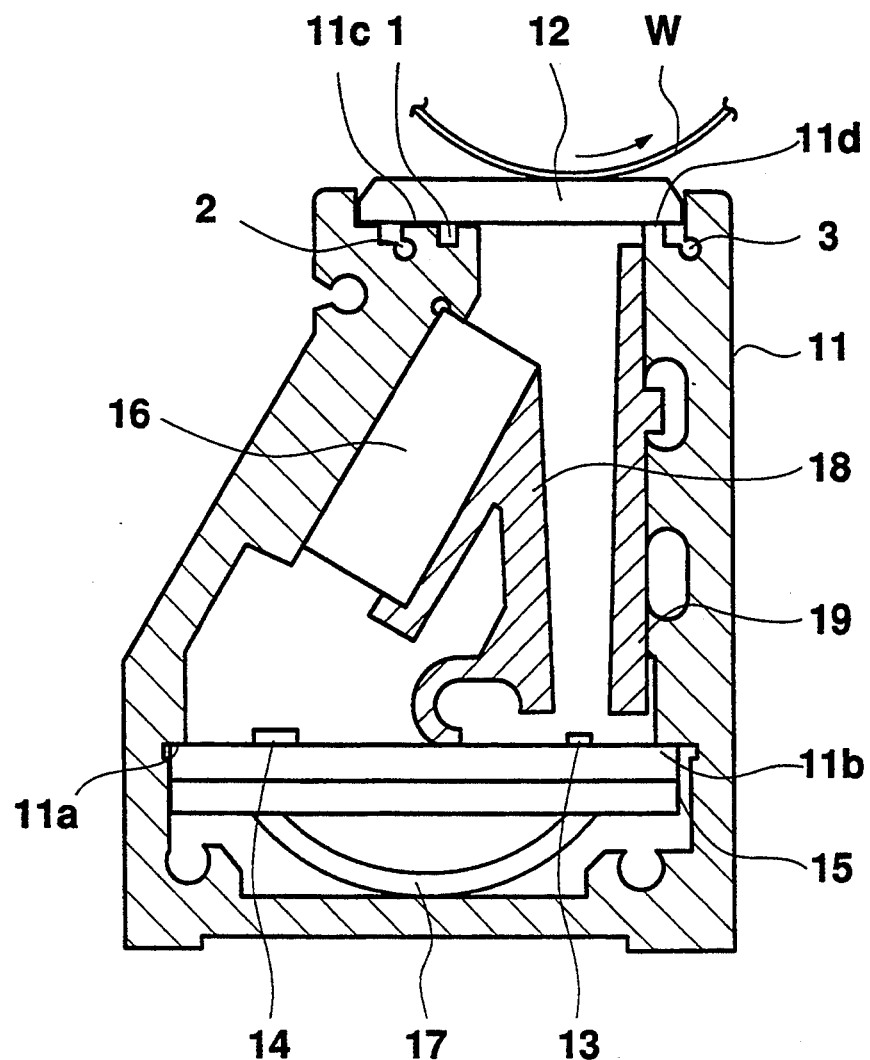
FIG. 3 is a cross-sectional view of the primary parts of an image sensor constructed in accordance with the present invention.
Figure 4:
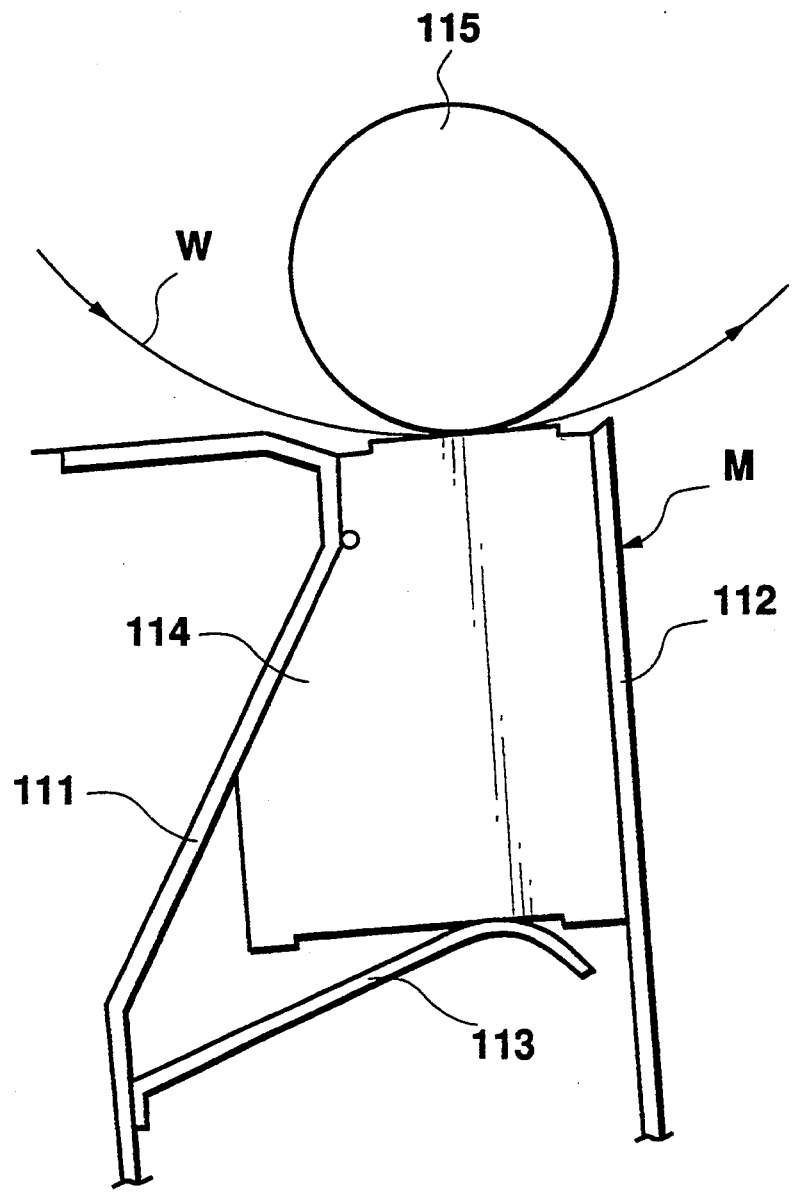
FIG. 4 illustrates the mounting of the image sensor.

Referring to FIG. 3, there is shown one embodiment of an image sensor constructed in accordance with the present invention. The image sensor comprises a frame 11 and a transparent covering (glass covering) 12 mounted on the frame 11 at the open top thereof. Within the interior of the frame 11, there are disposed a base plate 15 on which a light emitting element (LED chip or the like) 13 and a light receiving element (photodiode chip or the like) 14 are mounted, and a rod lens array 16 which defines an optical system for condensing and directing light reflected by an original document W, which is positioned on the glass covering 12, toward the light receiving element 14.

The base plate 15 is upwardly urged within the frame 11 by a substantially U-shaped resilient member or spring 17, the spring 17 engaging the bottom of the base plate 15. Thus, the base plate 15 is fixedly engaged by shoulders 11a and 11b formed in the inner wall of the frame 11. This can facilitate the focusing of the light receiving element 14 relative to the rod lens array 16 since the top face of the base plate 15 on which the light receiving element 14 is mounted can be used as a stationary reference plane independently of the accuracy in the frame 11. Although not illustrated, the spring 17 may comprise a pair of spring elements each having a length substantially equal to one-half of the length of the image sensor, each spring element being inserted into the frame through each open end.

The rod lens array 16 is fixedly urged against the inner wall of the frame 11 by a lens holder 18 such that the rod lens array 16 has an optical axis inclined relative to the bottom face of the glass covering 12.

The frame 11 further comprises a light reflecting plate 19 mounted on the inner wall thereof opposite to the rod lens array 16 and adapted to conduct the light from the light emitting element 13 to the original document W in an effective manner. The face of the lens holder 18 opposite to the light reflecting plate 19 also defines a light reflecting face.

Each of the light emitting and receiving elements mounted on the base plate 15 extends in a direction perpendicular to the plane of the sheet. The frame 11 is elongated along the direction in which these elements extend and closed by end coverings at the opposite ends. Each of the end coverings is also reflective. In the illustrated image sensor, therefore, the optical path from the light emitting element 13 to the glass covering 12 is enclosed by the light reflecting walls which may be made of any suitable reflective material or coated with any suitable colored material, for example, white-colored material.

Since the image sensor is elongated in the direction perpendicular to the plane of the sheet, the entire width of the original document W can be read at a time.

The top face of the frame 11 includes first and second grooves 1, 2 formed thereon at the leftward side 11c as viewed in FIG. 3 and extending along the length of the frame. The first and second grooves 1, 2 are spaced parallel to each other. The top face of the frame 11 also includes a third groove 3 formed therein at the right-hand side 11d.

After an adhesive has been charged in the first groove 1, the glass covering 12 is placed and pressed on the top face 11c, 11d of the frame 11. As a result, the glass covering 12 is fixedly adhered to the frame top. If any excess adhesive overflows out of the first groove 1, it will flow into the second groove 2. Therefore, the adhesive will not flow onto the outer and/or inner wall of the frame 11. As a result, the image sensor will not be adversely affected by the overflowed adhesive. The third groove 3 is preliminary and may be filled with a slight amount of adhesive. Furthermore, the adhesive may be applied to the interior of the groove or grooves merely at several points.

The reason why the lefthand side of the frame top includes two groove with the amount of adhesive being increased is that the transparent covering 12 should be more firmly secured to the frame top at the lefthand side thereof since the transparent covering 12 is more strongly pulled by a force from the original document W moved in a direction shown by an arrow at this lefthand side of the frame.

When the aforementioned image sensor is to be assembled into an electronic instrument such as facsimile machine, the instrument may have mounting guides 111 and 112 mounted on the main body thereof and a leaf spring 113 fixedly mounted on the mounting guide 112. In such an arrangement, an image sensor 114 can be mounted in place in the facsimile machine simply by inserting the image sensor 114 between the mounting guides 111 and 112. Furthermore, the image sensor 114 can be more reliably urged against a platen roller 115 under the influence of the leaf spring 113. Such an installation facilitates the mounting of the image sensor into the electronic instrument since the outline of the image sensor is used as a reference.

The illustrated embodiment enables the image sensor to be automatically assembled since any excess adhesive will not overflow onto the outer and/or inner walls of the frame 11, irrespectively of variations in the amount of adhesive to be used.

Figure 5:
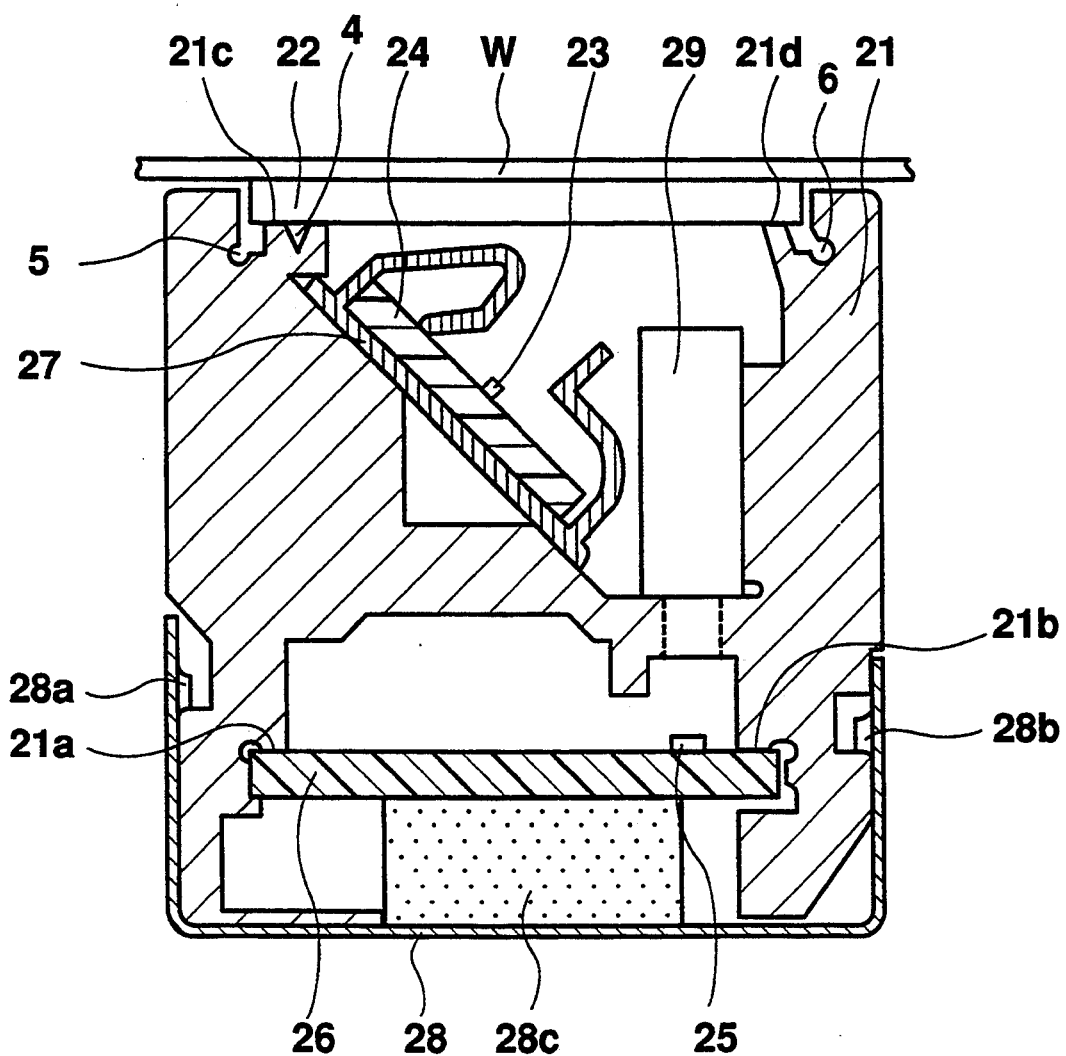
FIG. 5 is a cross-sectional view of the primary parts of another image sensor constructed in accordance with the present invention.

Referring next to FIG. 5, there is shown another embodiment of an image sensor constructed in accordance with the present invention. The image sensor comprises a frame 21; a bottom cap 28 fixedly mounted on the bottom of the frame 21 through projections 28a, 28b inwardly extending from the inner wall of the bottom cap 28, the bottom cap being configured in a U-shaped cross-section; a glass covering 22 mounted on the frame 21 at the top; a base plate 24 mounted in the frame 21 adjacent to the middle position thereof; a light emitting element 23 mounted on the base plate 24; another base plate 26 mounted in the frame 21 adjacent to the bottom thereof; and a light receiving element 25 mounted on the base plate 26.

The base plate 24 is fixedly,supported on the frame 21 through a support element 27 which is mounted on the frame 21.

The image sensor also comprises a rod lens array 29 mounted in the frame 21 such that it has an optical axis perpendicular to the glass covering and base plate 22, 26.

The base plate 26 is upwardly urged within the frame 21 by a sponge 28c of rectangular cross-section which engages the bottom of the base plate 26 and functions as a resilient member placed on the inner bottom of the bottom cap 28. Thus, the base plate 26 can be firmly held by engaging shoulders 21a, 21b which are formed in the inner wall of the frame 21. Since the top face of the base plate 26 is also used as a reference in this embodiment, the focusing of the light receiving element 25 can be easily carried out. The sponge 28c does not necessarily extend along the length of the image sensor. For example, the sponge 28c may comprise three parts which are placed at the opposite ends and center of the bottom cap 28 as viewed in the longitudinal direction of the frame 21.

In this embodiment, similarly, the top face of the frame 21 includes first and second grooves 4, 5 formed thereon at the lefthand side 21c as viewed in FIG. 5 and extending along the length of the frame. The first and second grooves 1, 2 are spaced parallel to each other. The top face of the frame 21 also includes a third groove 6 formed therein at the righthand side 21d. The glass covering 21 can be adhered to the frame top when the glass covering 21 has placed and pressed onto the frame top after an adhesive has been charged into the first groove 4. Any excess adhesive will flow into the second groove 5 and will not overflow onto the outer and/or inner walls of the frame 21. Consequently, the same advantage as in the first embodiment can be provided.

Figure 1:
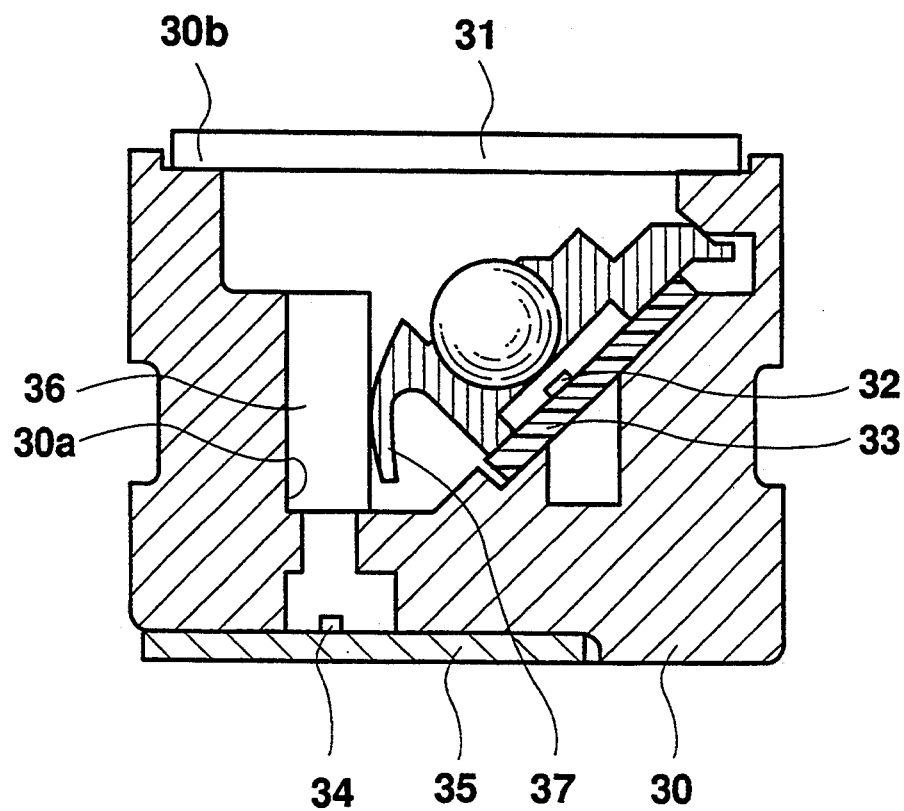
FIG. 1 is a cross-sectional view of the primary parts of an image sensor constructed in accordance with the prior art.
Figure 2:
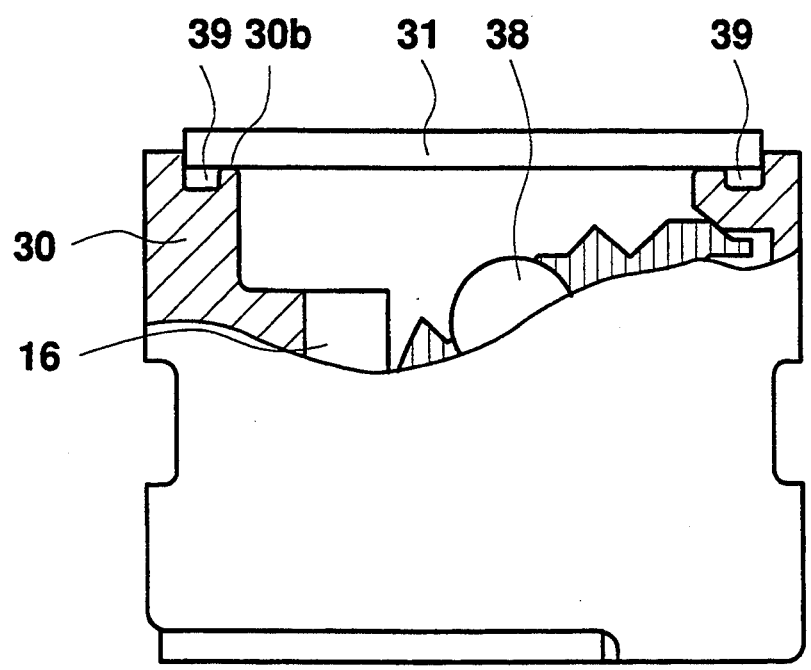
FIG. 2 is a cross-sectional view of the primary parts of another image sensor constructed in accordance with the prior art.

Although the cross-sectional configuration of the grooves is rectangular in the first groove 1 shown in FIG. 1 and V-shaped in the first groove 4 shown in FIG. 2, it may be formed into any other configuration, for example, a U-shaped configuration.

In accordance with the present invention, any excess adhesive will not flow from the adhesive receiving grooves onto the outer and/or inner walls of the frame. Therefore, the outer and/or inner wall of the frame will not be contaminated to degrade the quality of the image read by the image sensor. Moreover, the automated assembly of the image sensor may be attained with reduced cost since it is not necessary to wipe away any adhesive as it will not have overflowed onto the frame.

We claim:

1. An image sensor for reading an image on an object by irradiating light onto said object, said image sensor comprising
   a frame;
   a transparent covering mounted on said frame to close a reading window formed in the top of said frame, said transparent covering for contacting said object;
   a light emitting section mounted within said frame for irradiating light onto said object through said transparent covering;
   an optical system for condensing the light reflected by said object;
   a light receiving section for receiving the light from said optical system;
   a first groove formed in said frame along one side of said reading window for receiving an adhesive; and
   a second groove formed in said frame adjacent and spaced parallel to said first groove, said second groove being adapted to receive and hold overflow adhesive from the first groove when said transparent covering is adhered to said frame by the use of said adhesive.

2. An image sensor as defined in claim 1 wherein said first and second grooves extend along one side of said reading window which extends in a direction perpendicular to the direction of feed of said object.

3. An image sensor as defined in claim 2, further comprising a third groove formed in said frame top at the opposite side of said reading window to said one side of the same on which said first and second grooves are formed.

4. An image sensor as defined in claim 3 wherein the one side of said reading window on which said first and second grooves are formed is positioned rearwardly as viewed in the direction of movement of said object.

5. An electronic instrument having an image sensor for reading an image on an object by irradiating light onto said object, said image sensor comprising a frame; a transparent covering mounted on said frame to close a reading window formed in the top of said frame, said transparent covering being adapted to contact said object; a light emitting section mounted within said frame for irradiating light onto said object through said transparent covering; an optical system for condensing the light reflected by said object; a light receiving section for receiving the light from said optical system; a first groove formed in said frame along one side of said reading window; and a second groove formed in said frame adjacent and spaced parallel to said first groove, said second groove being adapted to receive and hold part of an adhesive when said transparent covering is adhered to said frame by the use of said adhesive.

6. In an image sensor for reading an image on an object by irradiating light onto said object, said image sensor comprising a frame; a transparent covering mounted on said frame to close a reading window formed in the top of said frame, said transparent covering being adapted to contact said object; a light emitting section mounted within said frame for irradiating light onto said object through said transparent covering; an optical system for condensing the light reflected by said object; a light receiving section for receiving the light from said optical system; a first groove formed in said frame along one side of said reading window; and a second groove formed in said frame adjacent and spaced parallel to said first groove, a method of adhering said transparent covering to said frame comprising the steps of:
   providing an adhesive in said first groove,
   placing and pressing said transparent covering on said frame, and
   collecting excess adhesive which overflows out of said first groove within said second groove.

7. The instrument of claim 5, further comprising a roller for providing said object from a first side of said transparent cover to a second side of said transparent cover, wherein the first and second grooves are adjacent the first side of said transparent cover.

8. An image sensor for reading an image on an object by irradiating light onto the object, the image sensor comprising:
   a frame;
   a transparent cover having a first side having a portion which contacts the frame at a mounting portion, and a second side for contacting the object;
   a light emitter mounted within the frame for irradiating light to the object through the transparent covering to cause reflected light from the object;
   a light receiver mounted within the frame for receiving the reflected light;
   a first groove formed in the frame at the mounting portion for receiving an adhesive; and
   means, adjacent and spaced from the first groove in the frame at the mounting portion, for receiving and holding adhesive which overflows from the first groove when the transparent covering is adhered to the frame by use of the adhesive.

9. The image sensor of claim 8, wherein the frame has an opening through which light from the light emitter passes when it contacts the object, wherein the mounting portion is adjacent the opening, wherein the first groove is intermediate the receiving and holding means so that the adhesive which overflows is directed away from the opening.

* * * * *